Feb. 15, 1944.    R. WILDERMUTH    2,341,679
SCREW GAUGE
Filed Aug. 22, 1940

Inventor
Richard Wildermuth
by
Atty.

Patented Feb. 15, 1944

2,341,679

UNITED STATES PATENT OFFICE 2,341,679

SCREW GAUGE

Richard Wildermuth, Stuttgart-Bad-Cannstatt, Germany; vested in the Alien Property Custodian Application August 22, 1940, Serial No. 353,760
In Germany May 17, 1939

1 Claim. (Cl. 33—199)

My invention relates to a thread gauge of the micrometer caliper type having a stationary anvil and a displaceable member, the projecting points or tips of which are designed to engage the threads of a threaded body to be measured.

It is an object of my invention to provide an improved instrument of this kind.

According to my invention the frame of the gauge carries, besides an exchangeable anvil member, which may be rigidly fixed to the frame, and a displaceable member, these two members being designed to engage in the threads at diametrically opposite points, a graduated member (measuring beam) operatively connected with the displaceable member and provided with an exchangeable scale body, in the form of a thimble.

By providing the instrument with an exchangeable scale member I obtain the advantage that various diameters and kinds of threads can be measured with a single gauge, the exchangeable scale members enabling the real measure or size as well as the allowed deviation (tolerance) to be determined or measured.

In the drawing affixed to this specification and forming part thereof an embodiment of my invention is illustrated diagrammatically by way of example.

In the drawing

Fig. 1 is a front elevation of an instrument according to the invention, partly in section, while

Figure 1:
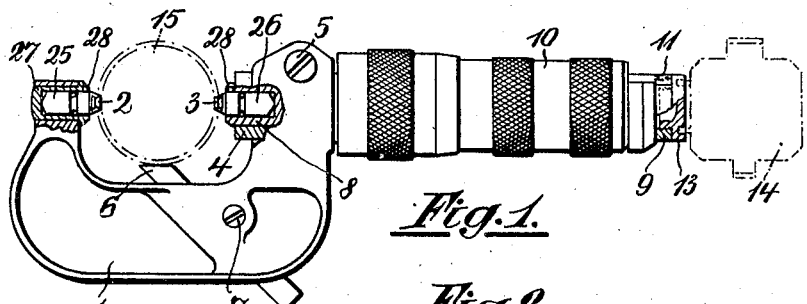
Figure 2:
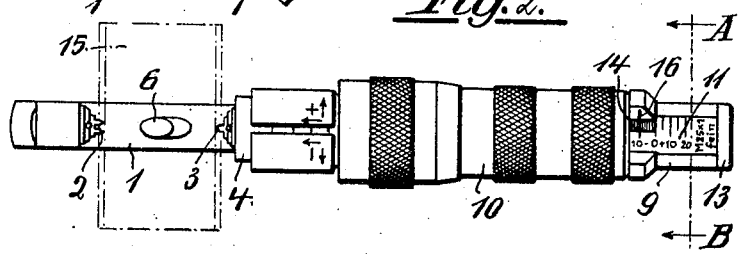
Fig. 2 is a plan view.
Figure 3:
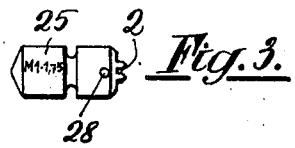
Fig. 3 shows the anvil drawn to a larger scale.
Figure 4:
Fig. 4 is an end view of same.
Figure 5:
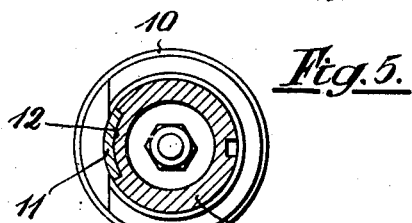
Fig. 5 is a sectional view along line A—B of Fig. 2 drawn to a larger scale.

Referring to the drawing, the instrument comprises the frame 1, the fixed anvil member 2, the displaceable member 3 and socket 4 to which the frame 1 is fixed with the aid of the set screw 5. The frame 1 further carries the supporting member 6 which is arranged for free displacement and can be fixed in position or adjusted by means of a clamping screw 7, and serves as support for the threaded work to be measured which is shown in Figs. 1 and 2 in dot and dash lines.

When the set screw 5 is loosened, the socket 4 arranged in frame 1 can be displaced axially and adjusted and locked. In this socket 4 is mounted a bearing 8 for the displaceable member 3. This bearing 8 can be displaced by means of the measuring member 9, which cooperates with a device which is arranged in the handle 10 and does not form a subject matter of the present invention.

On the measuring member 9 is arranged a scale body in the form of a thimble 17 exchangeably mounted on a member 18 and locked thereon by a cap screw.

Figure 6:
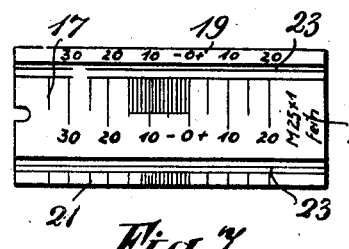
Fig. 6 is a similar section of a modified form.
Figure 7:
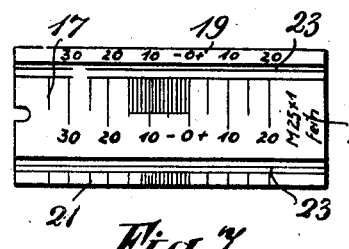
Fig. 7 shows the thimble-shaped scale body.

The thimble 17 carries four scales. Three of these scales 19, 20 and 21 can be seen in Fig. 6, while the fourth scale 22 is situated on the rear side as shown in Fig. 6. To this end the thimble 17 is formed with a number of grooves 23, to which a rigid key 24 is coordinated as guide member. The thimble 17 can be removed when the cap screw 13 is unscrewed. If a different scale shall be employed, the removed thimble 17 is turned through an angle of 90° or 180° and mounted on the member 18, with another groove 23 riding on the key 24, whereupon the cap 13 is screwed down, so that the gauge is now adjusted to a different scale.

I wish it to be understood that I do not desire to be limited to the exact details of construction shown and described, for obvious modifications will occur to a person skilled in the art.

I claim:

In a thread gauge having a casing and a measuring member extending within the casing and movable axially thereof, the combination wherein one end of said casing is provided with an axially extending cutaway part whereby said end of the casing only partially surrounds the measuring member, a scale carrier removably mounted on said measuring member, one end of said carrier being engaged within said extension and a surface portion of the carrier being visible through said cutaway part in the casing when the carrier is in working position, cap means removably engaging the end of said measuring member adjacent the free end of the carrier for retaining the carrier on the movable member when the carrier is in working position, said carrier being positionable on the measuring member in working positions wherein different portions on its surface are visible through said cutaway part in the casing, said carrier being provided with a plurality of separate axially extending grooves, and key means for engaging any desired groove when the carrier is mounted on said measuring member in a working position whereby to position a selected surface portion of the carrier in alignment with the cutaway part of the casing.

R. WILDERMUTH.